June 7, 1966   R. STELLA   3,255,363
TRIANGULAR TO SAWTOOTH WAVE FORM CONVERTER
Filed July 5, 1963
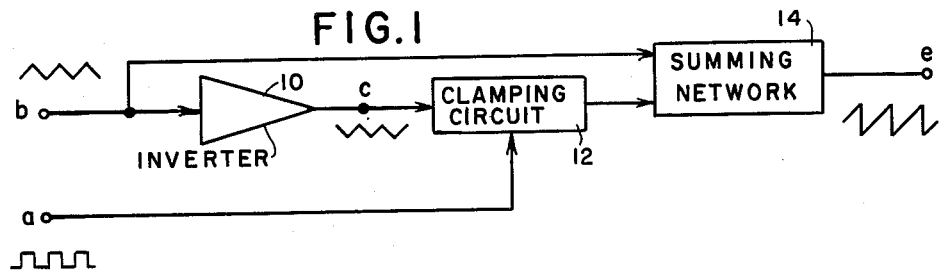
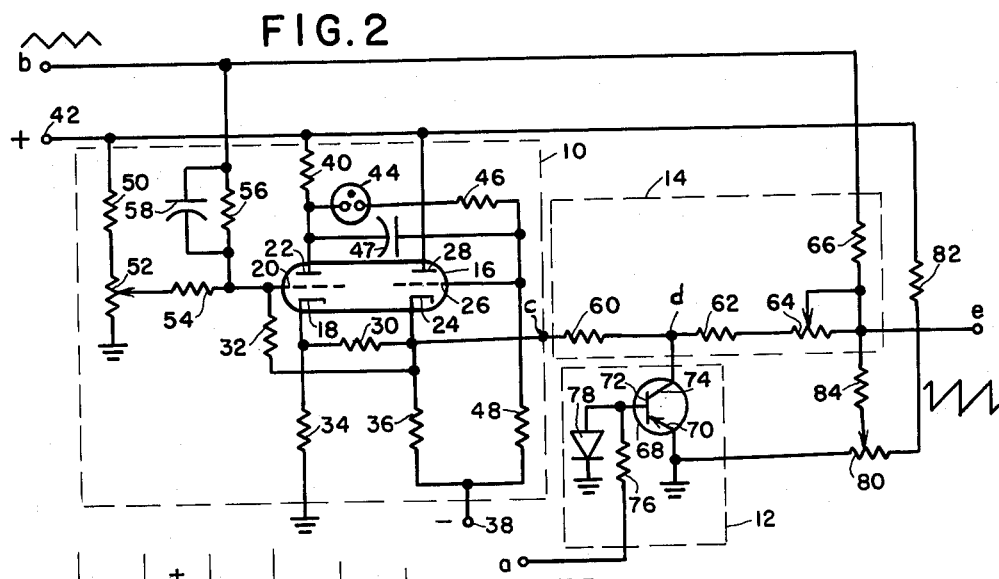
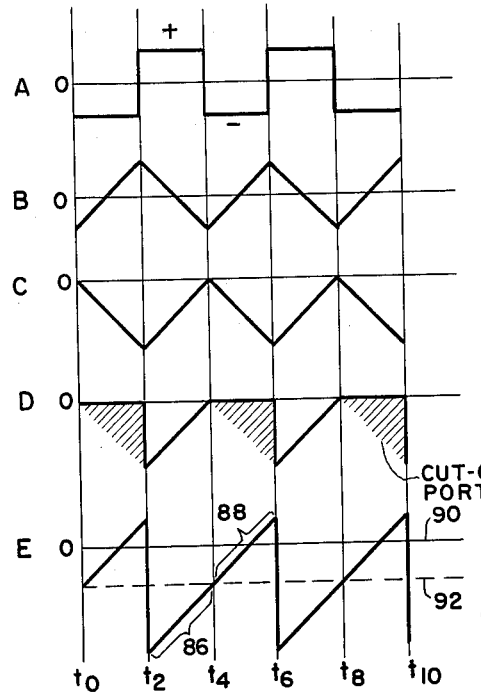
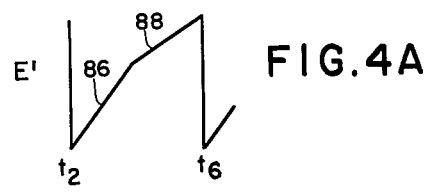
FIG.4A
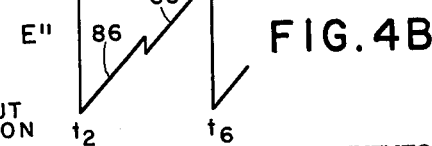
FIG.4B
INVENTOR
REMO STELLA
BY Hopgood & Calimafde
ATTORNEYS

United States Patent Office 3,255,363
Patented June 7, 1966

3,255,363
TRIANGULAR TO SAWTOOTH WAVE FORM CONVERTER
Remo Stella, Syosset, N.Y., assignor to Servo Corporation of America, Hicksville, N.Y., a corporation of New York
Filed July 5, 1963, Ser. No. 292,913
8 Claims. (Cl. 307—88.5)

This invention relates to electric waveform conversion and more particularly to apparatus for converting waveforms from one shape to another.

In certain types of electronic devices such as, for example, instruments for analyzing and testing servo mechanisms, there exists a need for a sawtooth wave. Circuits are of course known for providing sawtooth waves and such circuits could be used in the analyzing and test instruments referred to above. However, the sawtooth wave so developed would have to be synchronized by means of special synchronizing circuits with a triangular wave in the instrument in order for the instrument to carry out the functions for which it is designed. It has been found, however, that these waves cannot be perfectly synchronized and accordingly a phenomenon known as wave jitter results. Furthermore, there are other problems resulting from such a method of providing the needed waveforms, one of which is that acceptable tracking between the triangular wave generator and the sawtooth wave is most difficult to achieve over the frequency range encountered, which is presently of the order of less than .01 cycle per second to approximately 1000 cycles per second.

Accordingly it is an object of this invention to make available apparatus for providing a sawtooth wave which is in perfect synchronism with a triangular wave, thereby eliminating the jitter generally experienced in prior devices.

Another object of the invention is to eliminate the need for the synchronizing circuits heretofore required in similar devices of the prior art.

Still another object of the invention is to eliminate the tracking problem experienced in the prior art devices.

All of the objects, features and advantages of this invention and the manner of attaining them will become more apparent and the invention itself will be best understood by reference to the following description of an embodiment of the invention taken in conjunction with the accompanying drawing, in which FIG. 1 is a block diagram illustrating the concept of the invention;

FIG. 2 is a schematic wiring diagram of an illustrative embodiment of the invention, FIG. 3 shows a number of waveforms existing at various points in the diagrams of FIGS. 1 and 2, and FIGS. 4a and 4b illustrate portions of the sawtooth wave output under certain conditions of operation.

In accordance with the principles of the invention a triangular wave is first inverted to form a wave 180° out of phase with the triangular wave. This inverted triangular wave is then modified by removing predetermined portions thereof during each cycle of the wave. This latter modified wave and the original triangular wave are then combined by means of a suitable summing network to produce a sawtooth wave.

Referring now to FIG. 1 there is provided a signal or wave inverter 10 for receiving a triangular wave from an input terminal $b$. The output from the inverter 10 appears at the point $c$ and is delivered to a clamping circuit 12 which is also adapted to receive a rectangular or square wave from a terminal $a$. The wave at the point $c$, after being modified by the clamping circuit 12 in a manner to be hereafter described, is fed to a summing network 14, which combines this modified wave with the triangular wave from the input terminal $b$ to produce a sawtooth wave at the output terminal $e$.

Referring now to FIG. 2, the inverter 10 may include a tube 16 having two triode sections. The first section comprises a cathode 18, a control grid 20 and a plate 22, and the second section comprises a cathode 24, a control grid 26 and a plate 28. A positive feedback resistor 30 is connected between the two cathodes 18 and 24, and a negative feedback resistor 32 is connected between the control grid 20 and the cathode 24. A cathode resistor 34 is connected between the cathode 18 and ground and a cathode resistor 36 is connected between the cathode 24 and a negative potential terminal 38. A plate load resistor 40 is connected between the plate 22 and a positive potential terminal 42. The plate 28 is also connected to the positive potential terminal 42. The potential terminals 38 and 42 are connected, respectively, to the negative and positive potentials of a suitable power supply, not shown, to supply operating potential to the circuit, the chassis ground being connected to a suitable intermediate potential on the power supply. A neon bulb 44 and a resistor 46 are connected in series between the plate 22 and the control grid 26 in parallel with a capacitor 47. A resistor 48 is connected between the control grid 26 and the negative potential terminal 38. The neon bulb 44 and the resistors 46 and 48 serve to cause the inverter 10 to operate as a D.C. amplifier type circuit.

A voltage dividing network comprising a resistor 50 and a potentiometer 52 are provided in series between the positive potential terminal 42 and ground, and a resistor 54 is connected between the potentiometer slider and the control grid 20. The potentiometer 52 controls the D.C. operating level of the inverter 10 and serves as a waveform matching control as will appear. The input signal or wave B, see FIG. 3, is applied to the input control grid 20 from the terminal $b$ through an RC network comprising a resistor 56 and a capacitor 58.

The summing network 14 of FIG. 1 is shown in FIG. 2 as including resistors 60 and 62 in series with a potentiometer 64 and another resistor 66, for summing or combining the signals or waves from the terminal $b$ and from the output of the inverter 10 at the point $c$. The potentiometer 64 also serves as a slope matching control as will appear.

The clamping circuit 12 of FIG. 1 includes in FIG. 2, a transistor 68 having an emitter 70, base 72 and collector 74 and is shown as a PNP type but may also be of the NPN type with certain circuit modifications, as will be known to those skilled in the art. The base 72 of the transistor 68 is connected through a resistor 76 to the terminal $a$ for receiving the rectangular or square wave signal A, see FIG. 3. A diode 78 is also connected between the base 72 and ground. This diode 78 serves to protect the transistor against back biased signal overloads and also prevents signal transients in the collector circuit of the transistor 68. The collector 74 is connected to the junction point $d$ between the resistors 60 and 62.

The output wave derived from the circuit of FIG. 2 is provided between the terminal $e$ and ground. It is desirable to be able to set the level of this output wave with respect to zero potential on ground. This is achieved by means of a potentiometer 80 which forms a voltage divider with a resistor 82, the connection from the potentiometer slider to the output terminal $e$ being made through a D.C. level summing resistor 84.

Referring now to FIG. 3, wave forms A, B, C, D and E are shown, these wave forms being obtained at the points and terminals of FIG. 2 indicated by the corresponding lower case letters *a, b, c, d* and *e*. In order for the circuit of FIG. 2 to produce the desired sawtooth wave as shown by the wave form E, it should be observed that the triangular wave B must be synchronized with the rectangular wave A. This may be achieved, for example, by starting with the rectangular wave A and integrating it to produce the triangular wave B in a suitable integrating circuit, not shown, and well known to those skilled in the art.

The circuit operates in the following manner. With the triangular wave B applied to the terminal *b*, the inverter triangular wave C is produced at the output *c* of the inverter 10. The D.C. level of the inverter 10 is set by adjusting the waveform matching control 52 so that the upper apices of the wave C just touch the zero D.C. reference line, as shown in FIG. 3. Thus the inverter 10 produces a wave C at its output which is inverted and also shifted with respect to the D.C. level of the wave B. The inverted triangular wave C is then modified by the clamping circuit 12 which acts upon this wave to produce the waveform D. It will be seen that the wave D is produced as a result of the combined action of the square wave A and the inverted triangular wave C on the clamping circuit 12, which causes the transistor 68 to conduct during the time intervals $t_0$–$t_2$, $t_4$–$t_6$, etc. During these time intervals, i.e. during the negative portions of the square wave A, it will be appreciated that when the transistor 68 conducts, the point *d* will be clamped at ground potential and therefore the first half of each inverted triangular wave cycle shown at C will be cut out, i.e. reduced to a level of 0, as shown by the waveform D. During the positive halves of the rectangular wave A, however, the transistor 68 does not conduct and thus the second halves of the inverted wave C appear at the point *d*, as shown by the waveform D.

The resulting output wave E, is a sawtooth as shown in FIG. 3 and is produced by combining the triangular wave B with the wave D in the summing network 14. The wave E as shown will be produced when the peak level of the wave D is twice the value of the peak to peak level of the wave B.

As a practical matter the slopes of the individual component waves B and D which comprise the output wave E will not necessarily match, i.e., will not necessarily have the same slope, see FIG. 4A. Accordingly the slider on the potentiometer 64 must be adjusted when viewing the output wave E on an oscilloscope in order to insure that the slope of the sweep portion of the wave, i.e. the portion from $t_2$–$t_6$, $t_6$–$t_8$, etc., will be the same for both portions 86 and 88 of the sweep, as seen in FIG. 3. Additionally, it may be that the slopes of the waves B and D will be the same but that there will be a discontinuity from the end of one wave to the other, as shown in FIG. 4B. In this condition the component waves B and D also would not match and proper waveform matching would then be achieved by varying the slider of the potentiometer 52 until proper matching is produced, as seen by the wave E of FIG. 3. The D.C. level line 90 of the output wave E can be varied by the potentiometer 80 so that it is symmetrical about a new level, shown by the dashed line 92.

It should be noted that the circuit described above is but one possible embodiment of the invention and that numerous variations thereof can be devised. Accordingly, the inverter 10 need not necessarily include a vacuum tube 16 but any other suitable inversion means could be employed, such as a transistor circuit to name one alternative.

It will be apparent that the invention provides a number of important advantages. For the particular application in which the invention is employed, a triangular wave is already required in the device, and this wave is derived by integrating a square wave which is also already present. The circuit of the invention utilizes the triangular wave in combination with the square wave to derive the sawtooth wave and as a result the sawtooth wave is in synchronism with the triangular wave. Also the sawtooth wave produced by the invention is automatically perfectly synchronized with the triangular wave. Thus the need for utilizing synchronizing circuits in the prior devices referred to above is entirely eliminated. This results in the advantage of a sawtooth wave completely free of jitter and also in simplification of the required circuitry, and a reduction in servicing problems and in the cost of servicing and manufacture. Furthermore, the tracking problem over the relatively broad range of frequencies involved i.e. less than .01 cycle per second to over 1000 cycles per second, is now also eliminated. A still further important advantage is that the circuit of the invention is not frequency sensitive and thus requires no components whose values must be adjusted when a frequency change is made in an associated circuit with which it is used.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A circuit for developing a sawtooth wave from a triangular wave comprising
   means for inverting said triangular wave to thereby form a first intermediate wave, said first intermediate wave having a different voltage level with respect to a zero direct-current reference voltage level than said triangular wave,
   means for removing a selected one of the first and second halves of each cycle of said first wave to thereby form a second intermediate wave,
   and means for combining said triangular wave with said second intermediate wave to thereby form said sawtooth wave.

2. The invention described in claim 1 which further includes waveform matching control means coupled to said inverting means, to provide proper matching of said triangular and second waves to one another,
   and slope matching control means coupled to said combining means, for matching the slopes of said triangular and second waves to one another.

3. A circuit for developing a sawtooth wave from a triangular wave comprising
   an inverter for receiving a triangular wave and inverting the same to thereby form an inverted triangular wave at the output of said inverter, said inverted wave having a different voltage level with respect to a zero direct-current reference voltage level than said triangular wave,
   a summing network for combining said inverted wave with said triangular wave,
   and clamping means adapted to receive a rectangular wave which is synchronized with said triangular wave,
   said clamping means being connected to said summing network and being responsive to said rectangular wave to periodically eliminate portions of said inverted wave as it is being combined with said triangular wave, whereby a sawtooth wave is developed at the output of said summing network which is perfectly synchronized with said triangular wave.

4. The invention described in claim 3 wherein said summing network includes an adjustable resistance for matching the waveforms combined in said network to one another.

5. The invention described in claim 3 which further includes reference level control means coupled to said inverter for varying the direct-current reference voltage level of said sawtooth wave.

6. The invention described in claim 3 wherein said clamping means includes a transistor which is rendered conductive during alternate half cycles of said rectangular wave.

7. The invention described in claim 3 wherein said inverter comprises a direct-current amplifier type circuit.

8. The invention described in claim 7 which further includes a potentiometer for setting the operating point of said direct-current amplifier, whereby the slopes of the component waveforms which make up said sawtooth wave may be matched to one another.

No references cited.

ARTHUR GAUSS, *Primary Examiner.*

S. D. MILLER, *Assistant Examiner.*